United States Patent [19]

Claassen et al.

[11] Patent Number: 5,763,521
[45] Date of Patent: Jun. 9, 1998

[54] PREPARATION OF AN AQUEOUS POLYMER DISPERSION

[75] Inventors: Peter Claassen, Ludwigshafen; Onno Graalmann, Dossenheim; Wolfgang Alois Hormuth, St. Martin, all of Germany; Marinus Visseren, AD Zenenaar, Netherlands

[73] Assignee: BASF Aktiengesellschaft, Ludwigshafen, Germany

[21] Appl. No.: 760,338

[22] Filed: Dec. 4, 1996

[30] Foreign Application Priority Data

Dec. 4, 1995 [DE] Germany .......... 195 45 096.5

[51] Int. Cl.⁶ .............. C08F 2/22; C08F 236/04
[52] U.S. Cl. .......... 524/458; 524/460; 526/73; 526/80; 526/87; 526/201; 526/318.6; 526/338
[58] Field of Search .......... 524/458, 460; 526/73, 80, 81, 87, 88, 318.6, 338, 201, 203

[56] References Cited

U.S. PATENT DOCUMENTS 4,985,513  1/1991  Iwanaga et al. .......... 526/80

FOREIGN PATENT DOCUMENTS 0 007 042  1/1980  European Pat. Off. .
0 529 695  3/1993  European Pat. Off. .
1179428   1/1970  United Kingdom .

*Primary Examiner*—Fred Teskin
*Attorney, Agent, or Firm*—Oblon, Spivak, McClelland, Maier & Neustadt, P.C.

[57] ABSTRACT

An aqueous polymer dispersion is prepared by free radical aqueous emulsion polymerization of a mixture of monomers having at least one ethylenically unsaturated group, which comprises at least 30% by weight of monomers having two conjugated ethylenically unsaturated double bonds, by a process in which the polymerization temperature is varied in the course of the free radical aqueous emulsion polymerization.

16 Claims, No Drawings

PREPARATION OF AN AQUEOUS POLYMER DISPERSION

FIELD OF THE INVENTION

The present invention relates to a process for the preparation of an aqueous polymer dispersion by free radical aqueous emulsion polymerization of a mixture of monomers having at least one ethylenically unsaturated group, which comprises at least 30% by weight of monomers having two conjugated ethylenically unsaturated double bonds.

BACKGROUND OF THE INVENTION

Aqueous polymer dispersions (latices) are generally known. They are fluid systems which contain, as the disperse phase in an aqueous dispersing medium, polymer coils (ie. polymer particles) consisting of a plurality of intertwined polymer chains. The diameter of the polymer particles is in general mainly from 10 to 1500 nm.

In contrast to polymer solutions, aqueous polymer dispersions do not form thermodynamically stable systems. Rather, the system attempts to reduce the size of the interface between polymer and dispersing medium by combining the small primary particles to form larger secondary particles, which can be prevented for a relatively long time in the state of the disperse phase in the aqueous medium by adding dispersants (substances which are capable of stabilizing the interface between dispersed polymer and aquoeus dispersing medium).

This results in aqueous polymer dispersions being potentially capable of forming a cohesive polymer matrix both from their liquid form and from their foamed form (assuming a minimum volume content of dispersed polymer) on evaporation of the aqueous dispersing medium and/or on controlled deactivation of the dispersant, by partial or complete coalescence of the dispersed polymer particles, said polymer matrix corresponding to a transparent film in the first case under favorable conditions and to a gelled system in the second case.

While chemical bonding (in particular excessively dense chemial bonding) of different polymer chains within the polymer particles generally tends to be disadvantageous with regard to the formation of the abovementioned polymer matrix, subsequent chemical bonding (crosslinking) of the polymer chains constituting the polymer matrix, after formation of said matrix is complete, is often desirable for obtaining specific mechanical properties (eg. resilience).

These requirements which are apparently contradictory at a first glance can be reconciled in a simple manner if, in preparation of the aqueous polymer dispersion, which is usually carried out in a manner known per se by the free radical aqueous emulsion polymerization method (this polymerization procedure has been described in many publications and is sufficiently well known to a person skilled in the art, for example from the following literature: Encyclopedia of Polymer Science and Engineering, Vol. 8, S. 659 et seq. (1987); D. C. Blackly, in High Polymer Latices, Vol. 1, page 35 et seq. (1966); H. Warson, The Applications of Synthetic Resin Emulsions, page 246 et seq., Chapter 5 (1972); D. Diederich, Chemie in unserer Zeit 24, page 135–142 (1990); Emulsion Polymerization, Interscience Publishers, New York (1965); DE-A 4 003 422 and Dispersionen synthetischer Hochpolymerer, Teil I, F. Hölscher, Springer Verlag, Berlin (1969)), ie. in the presence of a dispersant and a free radical polymerization initiator, from monomers which have at least one ethylenically unsaturated group and are present directly as the disperse phase, a significant amount of at least one monomer having two conjugated ethylenically unsaturated double bonds is copolymerized (referred to below as monomers A). Suitable monomers A are, for example, butadiene, 2-methylbutadiene (isoprene) and 2,3-dimethylbutadiene.

If such a free radical aqueous emulsion polymerization is carried out in the presence of monomers A at temperatures which are not too high and with or without the use of substances which usually regulate the molecular weight, such as mercaptans (eg. tert-dodecyl mercaptan or n-dodecyl mercaptan), as a rule essentially only one of the two conjugated ethylenically unsaturated double bonds of the monomers A participates in the polymerization reaction.

This results in aqueous polymer dispersions whose dispersed polymer coils consist of polymer chains which on the one hand are essentially uncrosslinked (ie. not chemically bonded to one another) but on the other hand still have ethylenically unsaturated double bonds which, after formation of the desired polymer matrix is complete, can be activated by suitable vulcanization systems (eg. based on sulfur), which are usually incorporated before formation of the polymer matrix, in combination with elevated temperatures, and can be caused to undergo a specific reaction with formation of intramolecular crosslinking, with the result that a degree of crosslinking desired for the application can be obtained.

The prior art makes use of these relationships, for example, in the preparation of aqueous polymer dispersions which are particularly suitable for the production of immersion articles (eg. condoms or gloves) and of foamed rubber (cf. EP-A 378 380, EP-A 456 333, U.S. Pat. No. 2,880,189, DE-A 2 307 804, German Published Application DAS 1,297,067 and DE-A 1 951 340).

Mixtures of monomers which have at least one ethylenically unsaturated group and comprise at least 30% by weight of monomers having two conjugated ethylenically unsaturated double bonds are polymerized by the free radical aqueous polymerization method at an essentially constant temperature $Tp \leq 50°$ C., molecular weight regulators being present an required (cf. for example U.S. Pat. No. 2,399,017, DE-A 1 951 340 and DE-A 3 406 231).

The low polymerization temperature results in only a low degree of crosslinking which increases with the polymerization temperature under otherwise predetermined polymerization conditions and on the basis of which a specific mechanical property profile can be obtained by subsequent controlled vulcanization of the polymer matrix produced.

However, the disadvantage of these prior art free radical aqueous emulsion polymer methods is that, particularly when the monomer having conjugated double bonds is butadiene, the polymerization rate is unsatisfactory at the low polymerization temperatures.

SUMMARY OF THE INVENTION

It is an object of the present invention to provide a process for the preparation of an aqueous polymer dispersion by free radical aqueous emulsion polymerization of a mixture of monomers having at least one ethylenically unsaturated group, which comprises at least 30% by weight of monomers having two conjugated ethylenically unsaturated double bonds, which process, in the case of a given composition of the polymerization batch, takes place more rapidly than a free radical aqueous emulsion polymerization carried out at essentially constant temperature Tp, but leads to at least essentially the same (preliminary) degree of crosslinking relative to a free radical aqueous polymerization carried out in this manner.

For a given monomer composition, a suitable measure of the crosslinking density is the transverse nuclear magnetic resonance relaxation time of the protons ($^{1H}T_2$) chemically bonded to the polymer. In this publication, it was determined, at a sample temperature of 140° C. and a $^1H$ resonance frequency of 20 MHz, for a sample of the respective aqueous polymer dispersion converted into a film at 25° C. and then dried for 2 hours at 80° C. The relationship beween $^{1H}T_2$ and the crosslinking density is described, for example, in Macromolecules 27 (1994), 2111–2119. It is, finally, based on the fact that the transverse nuclear magnetic resonance relaxation time of an atomic nucleus having a magnetic moment is, on the one hand, a measure of the mobility of said nucleus in an external magnetic field and crosslinking of polymer chains differing from one another restricts their mobility. The lower the mobility of a polymer chain, ie. the greater the crosslinking density, the shorter is the transverse nuclear magnetic resonance relaxation time of atomic nuclei chemically bonded to this polymer chain and having a magnetic moment.

DESCRIPTION OF PREFERRED EMBODIMENTS

We have found that this object is achieved, according to the invention, by a process for the preparation of an aqueous polymer dispersion by free radical aqueous emulsion polymerization of a mixture of monomers having at least one ethylenically unsaturated group, which comprises at least 30% by weight of monomers having two conjugated ethylenically unsaturated double bonds, wherein a) the total amount of the monomer mixture to be polymerized is divided into n monomer portions, the integer n being $\geq 2$, preferably $2 \leq n \leq 5$, and each portion preferably comprising at least ([100/n]−10) mol %, based on the total amount of the monomer mixture to be polymerized, of monomers to be polymerized, b) the first monomer portion is initially taken together with dispersant, free radical polymerization initiator and aqueous dispersing medium in the polymerization vessel and is polymerized in a first polymerization stage, beginning at the polymerization temperature TP1, where $0°$ C.$\leq TP1 \leq 50°$ C., so that the temperature of the polymerization mixture increases by at least 20° C. (preferably continuously) to a maximum temperature TP1H, without exceeding 80° C. (preferably without exceeding 75° C.) and the polymerization temperature is then kept constant within the temperature interval from TP1H to TP1H −10° C. until a polymerization conversion U1 of at least 60 but not more than 90 mol %, based on the monomers to be polymerized in the first polymerization stage, is reached and the polymerization mixture is then cooled to a polymerization temperature TP2, where TP2=TP1±10° C. and 0° C.$\leq TP2 \leq 50°$ C., c) the second monomer portion is added and the monomer mixture then present in the polymerization vessel is polymerized in the presence of the polymer already formed and in the presence of a dispersant and polymerization initiator in a second polymerization stage, beginning at the initial polymerization temperature TP2, so that the temperature of the polymerization mixture increases (preferably continuously) by at least 20° C. to a maximum value TP2H without exceeding 80° C. (preferably without exceeding 75° C.) and the polymerization temperature is then kept constant within the temperature interval from TP2H to TP2H −10° C. until a polymerization conversion U2 of at least 60 but not more than 90 mol %, based on the total amount of monomers to be polymerized in the second polymerization stage, is reached and the polymerization mixture is then cooled to a polymerization temperature TP3, where TP3=TP1±10° C. and 0° C.$\leq TP3 \leq 50°$ C., d) the procedure is then continued with the remaining n-2 monomer portions in n-2 successive polymerization stages in a manner corresponding to that for the second monomer portion and e) at the end of the n th polymerization stage, the polymerization is continued at a temperature of from 0° to 50° C., if required up to a total polymerization conversion Utot of $\geq 95$ mol %, based on the total amount of monomers to be polymerized.

The novel process is suitable, for example, when the monomer mixture to be polymerized comprises at least one of the monomers butadiene, 2-methylbutadiene and 2,3-dimethylbutadiene as monomers having two conjugated ethylenically unsaturated double bonds (monomers A).

The monomer mixture to be polymerized according to the invention may consist only of monomers A but may also comprise comonomers which differ from monomers A and have at least one ethylenically unsaturated group. Frequently, the monomer mixture to be polymerized according to the invention contains from 30 to 90, often from 40 to 70, in many cases from 50 to 60, % by weight of the monomers A.

Comonomers which have a high molal water solubility ($\geq$ that of acrylonitrile) at atmospheric pressure (1 bar) and 25° C. are contained as a rule in amounts of up to 10, often from 3 to 8, % by weight in the monomer mixture to be polymerized according to the invention. Conventional monomers B are, for example, ($\alpha,\beta$-monoethylenically unsaturated mono- and dicarboxylic acids of 3 to 6 carbon atoms, such as acrylic acid, methacrylic acid, maleic acid, fumaric acid and itaconic acid, the salts of these carboxylic acids (in particular the alkali metal salts and the ammonium salt), the amides of the abovementioned $\alpha,\beta$-monoethylenically unsaturated carboxylic acids, eg. acrylamide and methacrylamide, and vinylsulfonic acid and its water-soluble salts (in particular the alkali metal salts and the ammonium salt) and N-vinylpyrrolidone. While butadiene is the preferred monomer A, methacrylic acid is the preferred monomer B.

The amount of other copolymerizable monomers having at least one ethylenically unsaturated group (monomers C) in the monomer mixture to be polymerized according to the invention may be up to 70% by weight. The amount of monomers C is frequently from 10 to 70, often from 30 to 60, in many cases from 40 to 50, % by weight. Suitable monomers C are, for example, vinylaromatic monomers, such as styrene, vinyltoluene or o-chlorostyrene, acrylonitrile, methacrylonitrile and esters of acrylic and methacrylic acid with alkanols of 1 to 8 carbon atoms, among which styrene, acrylonitrile and methyl methacrylate are particularly preferred monomers C.

This means that the novel process is suitable for the free radical aqueous emulsion polymerization of monomer mixtures consisting of

| from 30 to 100% by weight | of monomers A, |
|---|---|
| from 0 to 10% by weight | of monomers B and |
| from 0 to 70% by weight | of monomers C. |

Monomer mixtures suitable for the novel process therefore include those which consist of

| from 30 to 100% by weight | of at least one monomer selected from the group consisting of butadiene, 2-methylbutadiene and 2,3-dimethylbutadiene, |
|---|---|
| from 0 to 10% by weight | of at least one monomer selected from the group consisting of acrylic acid, methacrylic acid, maleic acid, fumaric acid, itaconic acid, acrylamide and methacrylamide and |
| from 0 to 70% by weight | of at least one monomer selected from the group consisting of styrene, acrylonitrile and methyl methacrylate. |

These include in particular monomer mixtures consisting of

| from 30 to 100% by weight of | butadiene, |
|---|---|
| from 0 to 10% by weight of | methacrylic acid and |
| from 0 to 70% by weight of | acrylonitrile. |

Abovementioned monomer mixture ranges are also suitable for an application of the novel process when the amounts by weight of the monomers A, B and C are distributed as follows:

| from 30 to 90% by weight of | monomers A, |
|---|---|
| from 1 to 10% by weight of | monomers B and |
| from 9 to 60% by weight of | monomers C. |

However, the novel process may also be used in the case of the following weight distribution:

| from 40 to 70% by weight of | monomers A, |
|---|---|
| from 1 to 10% by weight of | monomers B and |
| from 29 to 50% by weight of | monomers C. |

As in the prior art processes, in the novel process, too, the free radical aqueous emulsion polymerization is frequently carried out in the presence of molecular weight regulators (chain transfer agents), eg. mercaptans (alkanethiols), advantageously of 3 to 15 carbon atoms, as a further measure for limiting the degree of crosslinking. According to the invention, tert-dodecyl mercaptan or n-dodecyl mercaptan is preferably used as the molecular weight regulator. In these cases, the free radical aqueous emulsion polymerization is typically carried out, in each polymerization stage of the novel process, in the presence of from 0.1 to 3, frequently from 0.5 to 1.5, % by weight, based on the amount of monomers to be polymerized in the respective polymerization stage, of such molecular weight regulators.

Both the protective colloids usually used for carrying out free radical aqueous emulsion polymerizations and emulsifiers are suitable for ensuring the stability of the disperse phase of the polymer particles produced, during and after the end of the free radical aqueous emulsion polymerization.

Examples of suitable protective colloids are polyvinyl alcohols, cellulose derivatives, vinylpyrrolidone-containing copolymers or polycondensates of naphthalenesulfonic acid and formaldehyde whose number average relative molecular weight is advantageously from 4000 to 8000, based on atomic hydrogen. A detailed description of further suitable protective colloids appears in Houben-Weyl, Methoden der organischen Chemie, Volume XIV/1, Makromolekulare Stoffe, Georg-Thieme-Verlag, Stuttgart, 1961, pages 411 to 420. Mixtures of emulsifiers and/or protective colloids can of course also be used. Since, owing to their polarity, the monomers B have a significant solubility in the aqueous polymerization medium, in contrast to the monomers A and C, a combination of emulsifiers and protective colloids is frequently used when it is intended to obtain, as a result of the novel process, aqueous polymer dispersions whose dispersed polymer particles are chemically very uniform.

Advantageously used emulsifiers, which in contrast to the protective colloids are surfactants and hence capable of forming these cells, are those whose relative molecular weights, in contrast to the protective colloids, are usually less than 2000, in general less than 1000. They may be anionic, cationic or nonionic. Where mixtures of surfactants are used, the individual components must of course be compatible with one another, it being possible to check this by a few preliminary experiments in case of doubt. In general, anionic emulsifiers are compatible with one another and with nonionic emulsifiers. The same applies to cationic emulsifiers, whereas anionic and cationic emulsifiers are generally incompatible with one another. Conventional emulsifiers are, for example, ethoxylated mono-, di- and trialkylphenols (degree of ethoxylation: from 3 to 100, alkyl radical: $C_4$ to $C_{12}$), ethoxylated fatty alcohols (degree of ethoxylation: from 3 to 100, alkyl radical: $C_8$ to $C_{18}$) and alkali metal and ammonium salts of alkylsulfates (alkyl radical: $C_8$ to $C_{16}$), of sulfuric half-esters of ethoxylated alkanols (degree of ethoxylation: from 1 to 70, alkyl radical: $C_{12}$ to $C_{18}$) and ethoxylated alkylphenols (degree of ethoxylation: from 3 to 100, alkyl radical: $C_4$ to $C_{12}$), of alksulfonic acids (alkyl radical: $C_{12}$ to $C_{18}$), of arylsulfonic acids and of alkylarylsulfonic acids (alkyl radical: $C_9$ to $C_{18}$). Other suitable emulsifiers are the alkali metal and ammonium salts of alkylsulfates (alkyl radical: $C_{10}$ to $C_{18}$) and of aryl- and alkylarylsulfates (alkyl radical: $C_9$ to $C_{18}$). Further suitable emulsifiers, such as sulfosuccinic esters, are described in Houben-Weyl, Methoden der organischen Chemie, Volume XIV/1, Makromolekulare Stoffe, Georg-Thieme Verlag, Stuttgart, 1961, pages 192 to 208.

Since the basic principle of the two most important methods for latex foam rubber production—the Dunlop and the Talalay process—consist in bringing about the gelling of a foamed aqueous polymer dispersion stable at pH of >7 by reducing the pH, the alkali metal (in particular sodium and potassium) and ammonium salts of $C_8$–$C_{18}$-fatty acids (saturated and unsaturated) and of disproportionated resin acids obtained from rosin (dresinates) are particularly preferred emulsifiers for stabilizing the aqueous polymer dispersions to be prepared according to the invention. Among these, the potassium, sodium and ammonium salts of palmitic acid, oleic acid, stearic acid, linoleic acid and linolenic acid are particularly preferred. In general, anionic stabilization is preferred.

As a rule, each polymerization stage of the novel process has from 0.5 to 10, in general from 1 to 5, % by weight, based on the amount of the monomers to be polymerized in the respective polymerization stage, of dispersant.

Suitable free radical polymerization initiators for the novel free radical aqueous emulsion polymerization are in principle all those which are capable of initiating a free radical aqueous emulsion polymerization at $\leq 50°$ C. These may be both peroxides and azo compounds. Preferably, combined systems which are composed of at least one reducing agent and at least one peroxide and/or hydroperoxide are used since the reducing agents activate free radical formation and thus permit initiation of the novel free radical aqueous emulsion polymerization at low temperatures.

Examples of suitable reducing agents are ascorbic acid, acetone bisulfite, the sodium salt of hydroxymethanesulfinic acid, sodium sulfite, sodium bisulfite and sodium dithionite. The abovementioned combined (redox initiator) systems very particularly preferably additionally comprise a small amount of a metal compound which is soluble in polymerization medium and whose metallic component may occur in a plurality of valency states. Examples of such metal compounds are iron(II) salts, such as iron(II) sulfate. Instead of a water-soluble iron(II) salt, a combination of water-soluble Fe/V salts are also frequently used. Redox initiator systems of this type which contain such a metal compound are advantageous in that they permit initiation of the novel free radical aqueous emulsion polymerization at even lower temperatures. Examples of such redox initiator systems are ascorbic acid/iron(II) sulfate/hydrogen peroxide or sodium dithionite+sodium formaldehyde sulfoxylate/iron(II) sulfate/paramenthane hydroperoxide or diisopropylbenzene hydroperoxide or cumyl hydroperoxide. Frequently, a small amount of a chelating agent is also added to such redox initiator systems containing a metal compound, in order to ensure that the metallic component is present in the solution and is not removed from the reaction system, for example by a precipitation reaction. The sodium salts of ethylenediaminetetraacetic acid may be mentioned as examples of such a chelating agent. Frequently, the metallic component is added directly as a chelate complex.

The amount of initiator to be used in each polymerization stage of the novel process is as a rule from 0.01 to 5, in general from 0.01 to 1, % by weight, based on the monomers to be polymerized. As a rule, polymerization is effected, according to the invention, under an inert gas atmosphere.

According to the invention, the total amount of monomers to be polymerized should be divided into n monomer portions, where n may be, for example, 2, 3, 4 or 5. n may of course also be greater than 5, but this is not advantageous for large-scale industrial production. n is advantageously 2 or 3.

The polymerization conversion U to be aimed at in the respective polymerization stage is advantageously from 70 to 85 mol %, based on the monomers to be polymerized in the respective polymerization stage (this total amount is composed of the amount of monomers remaining unpolymerized in the preceding polymerization stage and the amount of monomers added freshly for this polymerization stage).

Furthermore, the novel polymerization process includes in particular those embodiments in which TP1 is from 0° C. to 20° C. and the maximum values TPnH in the respective polymerization stages are from 50° to 75° C. or from 40° to 50° C.

As a rule, the novel polymerization process is designed in such a way that the composition of the monomer mixtures to be polymerized in the individual polymerization stages is essentially the same, ie. the various monomers are mixed with one another in a simple manner and the mixture is divided into the required n portions. Of course, the monomer mixtures to be polymerized in the individual polymerization stages may also have different compositions.

If, for example, monomers whose residual monomers remaining after the end of the novel free radical aqueous emulsion polymerization are difficult to remove from the production mixture (eg. acrylonitrile) are copolymerized, it may be advantageous, in the final polymerization stage, to increase the relative amount of monomer types which are relatively readily removable as residual monomers (eg. butadiene). Furthermore, the amount of molecular weight regulator may be varied from stage to stage if required. The increase in the polymerization temperature which is required according to the invention in the individual polymerization stages can be achieved in a simple manner by means of a quasi-adiabatic reaction (the heat of polymerization evolved remains in the polymerization mixture) until the respective maximum temperature is reached. If the desired polymerization conversion (at least 60 and not more than 90 mol %) has been reached before the desired maximum temperature is reached, the polymerization mixture can be cooled to TP1±10° C. immediately thereafter. Otherwise, the maximum polymerization temperature is essentially maintained according to the invention for some time until a desired conversion is reached.

The novel free radical aqueous emulsion polymerization is usually carried out in the individual polymerization stages in such a way that in each case the total amount of the polymerization batch intended for the respective stage (including any molecular weight regulator concomitantly to be used), without the free radical initiator, is initially taken in the polymerization vessel, the initiation temperature is established and the free radical initiator is then added (as a rule all at once) to the polymerization vessel and polymerization is effected. In the quasi-adiabatic polymerization procedure, as a rule the operating pressure also increases with the polymerization temperature. The operating pressure is usually from 1 to 15, frequently from 1 to 6, in many cases from 1 to 3, atm. It is often advantageous to stop the temperature increase by external temperature regulation when the operating pressure has reached its natural maximum value in the quasi-adiabatic procedure.

Preferably, the predominant amount ($\geq 50\%$) (as a rule, however, at least 10%) of the total required aqueous dispersing medium is added to the first polymerization stage, since this increases the contact area (heat exchange area) with the polymerization vessel. The monomers to be polymerized are added to the polymerization vessel in the respective polymerization stage, preferably in a form preemulsified in the aqueous medium.

In the first polymerization stage, a seed latex may be added if required (usually not more than 1% by weight, based on the monomers to be polymerized in this stage). This measure generally ensures a controlled polymerization sequence. For example, the use of a polystyrene seed latex whose polymer particle diameters are about 30 nm is possible in this context.

The final size of the polymer particles of the aqueous polymer dispersion obtainable by the novel process can be influenced by means of the amount of dispersant. Frequently, weight average diameters $\bar{d}_w$ of from 50 to 200 nm, in many cases from 50 to 150 nm, are established. The solids volume content is as a rule from 30 to 60, in general from 40 to 50, % by volume. During the polymerization, further free radical initiators and/or dispersants may of course be added in the respective polymerization stage in order to achieve the desired polymerization conversion and for additional stabilization of the aqueous polymer dispersion.

Furthermore, buffers, such as an alkali metal phosphate, may be added during the emulsion polymerization in order to stabilize the pH of the aqueous dispersing medium. The addition of small amounts of strong electrolytes, such as potassium sulfate, potassium chloride and/or sodium sulfate, facilitates, in a manner known per se, the establishment of the desired polymer particle diameters by a controlling influence in the phase of polymer particle formation.

The continuation of the novel process (serves primarily for reducing the amount of residual monomers), which may have to be carried out at the end of the n th polymerization stage up to a total polymerization conversion of ≥95 mol %, is preferably effected at TP1±10° C. If required, a further polymerization initiator is added. The adduct of acetone with the bisulfite anion in combination with tert-butyl hydroperoxide (and, if required, a transition metal ion) is preferably used as such (cf. DE-A 4 419 518 and DE-A 4 435 423), since this initiator system results in only little subsequent crosslinking.

To terminate the novel free radical emulsion polymerization, the polymerization reaction is as a rule stopped by adding polymerization inhibitors, such as diethylhydroxylamine, and unconverted monomers are then removed in a manner known per se by deodorization (preferably stripping and/or steam distillation).

As stated above, aqueous polymer dispersions prepared by the novel process are suitable, through their singular nature, as equivalents to the synthetic cold rubbers, in particular for the production of immersion articles (condoms, gloves) and of latex-based foamed rubber (for example, mattresses and carpet backings). The relevant production processes are known per se to a person skilled in the art.

Frequently, antiaging agents, such as antioxidants or bactericides, are also added to the aqueous polymer dispersions obtainable according to the invention prior to such an application. Examples of these are Naugawhite®, Wingstay® and Proxel® XL2.

Comparative Examples VD and Examples BD for the novel process (the polymerization was carried out in all cases under an $N_2$ atmosphere and with the addition of sodium dithionite, which acts here as an oxygen acceptor)
VD1: A mixture consisting of

| 438 g | of water, |
|---|---|
| 76 g | of a 15% strength by weight aqueous solution of the sodium salt of dodecylbenzenesulfonic acid, |
| 8 g | of Tamol® NN 4501 (45% strength by weight aqueous solution of the sodium salt of a naphthalenesulfonic acid/formaldehyde condensate (number average relative molecular weight: 6500)), |
| 0,8 g | of sodium sulfate, |
| 3 g | of tert-dodecyl mercaptan, |
| 22.8 g | of methacrylic acid (6% by weight) |
| 148.2 g | of acrylonitrile (39% by weight) and |
| 209 g | of butadiene (55% by weight) | was initially taken in a polymerization vessel (stirred pressure-resistant reactor of V2A stainless steel) and cooled to 10° C.

Thereafter, while maintaining the temperature of 10° C., first a mixture of

| 3 g | of water and |
|---|---|
| 0.1 g | of sodium dithionite | and then a mixture of

| 0.05 g | of the sodium salt of hydroxymethanesulfinic acid, |
|---|---|
| 0.015 g | of Sequestrene® Na—Fe (mixed Na/Fe salt of ethylenediaminetetraacetic acid) and |
| 3 g | of water | were each added all at once.

A solution of 0.20 g of an 80% strength by weight aqueous cumyl hydroperoxide solution in 6 g of water was then added all at once, after which polymerization was effected while maintaining the temperature of 10° C. After 11 hours, the polymerization conversion was 50 mol %. After 24 hours, the polymerization was stopped by adding a mixture of

| 6 g | of water, |
|---|---|
| 0.2 g | of diethylhydroxylamine, |
| 0.3 g | of the sodium salt of hydroxymethanesulfinic acid and |
| 8.7 g | of 25% strength by weight aqueous ammonia solution, | at a polymerization conversion of 95 mol %. The remaining monomers were substantially removed by stripping by means of steam.

The film of the resulting aqueous polymer dispersion had a $^{1H}T_2$ value of 3.8 ms.

VD2: As with VD1, except that the polymerization was carried out at 70° C. The polymerization conversion of 95 mol % was reached after only 6 hours. The remaining monomers were substantially removed by stripping by means of steam. The film of the resulting aqueous polymer dispersion had a $^{1H}T_2$ value of 0.3 ms.

VD3: A mixture of

| 441 g | of water, |
|---|---|
| 76 g | of a 15% strength by weight aqueous solution of the sodium salt of a secondary alkanesulfonic acid ($C_{13}/C_{17}$ mixture), |
| 8 g | of Tamol NN 4501, |
| 0.8 g | of sodium sulfate, |
| 4.8 g | of tert-dodecyl mercaptan, |
| 22.8 g | of methacrylic acid (6% by weight), |
| 167.2 g | of acrylonitrile (44% by weight) and |
| 190 g | of butadiene (50% by weight) | was initially taken in a polymerization vessel (stirred pressure-resistant reactor made of V2A stainless steel) and cooled to 10° C.

Thereafter, while maintaining the temperature of 10° C., first a mixture of

| 3 g | of water and |
|---|---|
| 0.1 g | of sodium dithionite | and then a mixture of

| 0.05 g | of the sodium salt of hydroxymethanesulfinic acid, |
|---|---|
| 0.015 g | of Sequestrene Na—Fe and |
| 3 g | of water | were each added all at once. A solution of 0.20 g of an 80% strength by weight aqueous cumyl hydroperoxide solution in 6 g of water was then added all at once, after which polymerization was effected while maintaining the temperature of 10° C.

After 24 hours, the polymerization was stopped by adding a mixture of

| 6 g | of water, |
|---|---|
| 0.2 g | of diethylhydroxylamine, |
| 0.3 g | of the sodium salt of hydroxymethanesulfinic acid and | at a polymerization conversion of 95 mol %. The remaining monomers were substantially removed by stripping by means of steam.

The film of the resulting aqueous polymer dispersion had a $^{1H}T_2$ value of 4.2 ms.

BD1: A mixture of

| | |
|---|---|
| 436 g | of water, |
| 0.8 g | of sodium sulfate, |
| 8.4 g | of Tamol NN 4501, |
| 53.3 g | of a 15% strength by weight aqueous solution of the sodium salt of dodecylbenzenesulfonic acid, |
| 1.6 g | of tert-dodecyl mercaptan, |
| 0.02 g | of Sequestrene Fe—Na, |
| 12 g | of methacrylic acid (3% by weight) |
| 78 g | of acrylonitrile (19.5% by weight) and |
| 110 g | of butadiene (27.5% by weight) | was initially taken in a polymerization vessel (stirred pressure-resistant reactor made of V2A stainless steel) and cooled to 10° C.

Thereafter, while maintaining the temperature of 10° C., first a mixture of

| | |
|---|---|
| 4.3 g | of water and |
| 0.1 g | of sodium dithionite | and then a mixture of

| | |
|---|---|
| 0.04 g | of the sodium salt of hydroxymethanesulfinic acid and |
| 5 g | of water | were each added all at once.

Thereafter, a solution of 10 g of water, 0.08 g of a 15% strength by weight aqueous solution of the sodium salt of dodecylbenzenesulfonic acid and 0.1 g of an 80% strength by weight aqueous cumyl hydroperoxide solution was added all at once, after which polymerization was effected by a quasi-adiabatic procedure until the temperature of the reaction mixture was increased continuously to 50° C. This was the case after 1.5 hours. Polymerization was then continued for a further 2 hours while maintaining the temperature of 50° C. The resulting conversion was then 70 mol %.

The polymerization mixture was then cooled to 10° C. in the course of 10 minutes by indirect cooling.

A mixture of

| | |
|---|---|
| 110 g | of butadiene (27.5% by weight), |
| 78 g | of acrylonitrile (19.5% by weight), |
| 12 g | of methacrylic acid (3% by weight), |
| 25.6 g | of a 15% strength by weight aqueous solution of the sodium salt of dodecylbenzenesulfonic acid and |
| 1.6 g | of tert-dodecyl mercaptan | was then added all at once to the polymerization vessel. Thereafter, 0.04 g of the sodium salt of hydroxymethanesulfinic acid, dissolved in 9 g of water, was added all at once (10° C.).

Finally, a solution of 68 g of water, 0.1 g of a 15% strength by weight aqueous solution of the sodium salt of dodecylbenzenesulfonic acid and 0.1 g of an 80% strength by weight aqueous cumyl hydroperoxide solution was added all at once, after which polymerization was effected by a quasi-adiabatic procedure until the temperature of the reaction mixture increased continuously to 72° C. At this time (1.5 hours after the beginning of the second polymerization stage), the polymerization conversion in this second polymerization stage, U2, was 69 mol %, based on the total amount of monomers to be polymerized in this stage. The polymerization conversion was 80 mol %, based at this time on the total amount of monomers to be polymerized. The polymerization mixture was then cooled to 10° C. in the course of 10 minutes by indirect cooling and was stirred for a further 5 hours while maintaining this temperature (postpolymerization). To stop the polymerization reaction, a mixture of 5 g of water, 0.24 g of diethylhydroxylamine and 8 g of 25% strength by weight aqueous ammonia was then added. The polymerization conversion at this point was ≧95 mol %, based on the total amount of monomers to be polymerized. The remaining monomers were substantially removed by stripping by means of steam. The film of the resulting aqueous polymer dispersion had a $^{1H}T_2$ value of 3.7 ms, ie. a product of the same quality as in the case of VD1 was obtained in less than half the polymerization time.

BD2: A mixture of

| | |
|---|---|
| 436 g | of water, |
| 0.8 g | of sodium sulfate, |
| 8.4 g | of Tamol NN 4501, |
| 53.3 g | of a 15% strength by weight aqueous solution of the sodium salt of a secondary alkanesulfonic acid ($C_{13}/C_{17}$ mixture), |
| 1.6 g | of tert-dodecyl mercaptan, |
| 0.02 g | of Sequestrene Fe—Na, |
| 12 g | of methacrylic acid (3% by weight), |
| 88 g | of acrylonitrile (22% by weight) and |
| 100 g | of butadiene (25% by weight) | was initially taken in a polymerization vessel (stirred pressure-resistant reactor made of V2A steel) and cooled to 10° C.

Thereafter, while maintaining the temperature of 10° C., a mixture of

| | |
|---|---|
| 4.3 g | of water and |
| 0.04 g | of the sodium salt of hydroxymethanesulfinic acid | and then a mixture of

| | |
|---|---|
| 5.3 g | of water and |
| 0.1 g | of sodium dithionite | were added all at once.

A solution of 10 g of water, 0.08 g of a 15% strength by weight aqueous solution of the sodium salt of dodecylbenzenesulfonic acid and 0.1 g of an 80% strength by weight aqueous cumyl hydroperoxide solution was then added all at once, after which polymerization was effected by a quasi-adiabatic procedure until the temperature of the reaction mixture increased continuously to 71° C. At this time (1.5 hours after the beginning of polymerization), the polymerization conversion in this first polymerization stage, U1, was 85 mol %.

The reaction mixture was then cooled to 10° C. in the course of 10 minutes by indirect cooling.

A mixture of

| | |
|---|---|
| 100 g | of butadiene (25% by weight), |
| 88 g | of acrylonitrile (22% by weight), |
| 12 g | of methacrylic acid (3% by weight), |
| 25.6 g | of a 15% strength by weight aqueous solution of the sodium salt of a secondary alkanesulfonic acid ($C_{13}/C_{17}$ mixture) and |
| 1.6 g | of tert-dodecyl mercaptan | was then added all at once to the polymerization vessel. Thereafter, 0.04 g of the sodium salt of hydroxymethanesulfinic acid, dissolved in 9 g of water, was added all at once (10° C.).

Finally, a solution of 68 g of water, 0.1 g of a 15% strength by weight aqueous solution of the sodium salt of a secondary alkanesulfonic acid ($C_{13}/C_{17}$ mixture) and 0.1 g of an 80% strength by weight aqueous cumyl hydroperoxide solution was added all at once, after which polymerization was effected by a quasi-adiabatic procedure until the temperature of the reaction mixture increased continuously to 70° C. At this time (1.5 hours after the beginning of the second polymerization stage), the polymerization conversion in this second polymerization stage, U2, was 74 mol %, based on the total amount of monomers to be polymerized in this stage. The polymerization conversion was 85 mol %, based at this time on the total amount of monomers to be polymerized. The polymerization mixture was then cooled to 10° C. in the course of 10 minutes by indirect cooling and was stirred for a further 4 hours while maintaining this temperature (postpolymerization). To stop the polymerization reaction, a mixture of 5 g of water, 0.24 g of diethylhydroxylamine and 8 g of a 25% strength by weight aqueous ammonia was then added. The polymerization conversion at this point was $\geq 95$ mol %, based on the total amount of monomers to be polymerized. The remaining monomers were substantially removed by stripping by means of steam. The film of the resulting aqueous polymer dispersion had a $^{1H}T_2$ value of 4.4 ms, ie. a product of the same quality as in the case of VD3 was obtained in less than half the polymerization time.

BD3: As for BD1. However, the temperature increased to 51° C. in the first polymerization stage (duration: 1 hour). Thereafter, this temperature was maintained for a further 2 hours (U1 at this time: 80 mol %) and cooling to 10° C. was effected only thereafter.

Similarly, the temperature increased only to 54° C. in the second polymerization stage (duration: 1 hour). This temperature was then maintained for a further 2 hours (U2 at this time: 83 mol %, Utot at this time: 90 mol %). After cooling to 10° C., stirring was carried out for a further hour at this temperature. Utot was then $\geq 95$ mol %. After stripping of the remaining monomers, a $^{1H}T_2$ value of the film was determined as 4.2 ms.

BD4: As for BD1. However, the temperature increased only to 35° C. in the first polymerization stage (duration: 0.5 hour). This temperature was then maintained for a further 3 hours (U1 at this time: 85 mol %) and cooling to 10° C. was effected only thereafter.

Similarly, the temperature increased only to 30° C. in the second polymerization stage (duration: 0.5 hour). This temperature was then maintained for a further 3 hours (U2 at this time: 60 mol %, Utot at this time: 57.5 mol %). After cooling to 10° C., stirring was carried out for a further 3 hours at this temperature. Utot was then a $\geq 95$ mol %. After stripping of the remaining monomers, a $^{1H}T_2$ value of the film was determined at 4.1 ms.

BD5: As for BD1. However, TP1 was 20° C. Furthermore, the temperature increased only to 42° C. in the first polymerization stage (duration: 1 hour). This temperature was then maintained for a further 2 hours (U1 at this time: 80 mol %) and cooling to 20° C. was effected only thereafter. Similarly, the temperature increased only to 42° C. in the second polymerization stage (duration: 1 hour). This temperature was then maintained for a further 2 hours (U2 at this time: 83 mol %, Utot at this time: 90 mol %).

After cooling to 20° C., stirring was carried out for a further 2 hours at this temperature. Utot was then $\geq 95$ mol %. After stripping of the remaining monomers, a $^{1H}T_2$ value of the film was determined at 3.8 ms.

We claim:

1. A process for the preparation of an aqueous polymer dispersion by free radical aqueous emulsion polymerization of a mixture of monomers having at least one ethylenically unsaturated group, which comprises at least 30% by weight of monomers A having two conjugated ethylenically unsaturated double bonds, wherein a) the total amount of the monomer mixture to be polymerized is divided into n monomer portions, n being $\geq 2$, b) a first monomer portion is initially taken together with dispersant, free radical polymerization initiator and aqueous dispersing medium in a polymerization vessel and is polymerized in a first polymerization stage, beginning at the polymerization temperature TP1, where 0° C. $\leq$ TP1 $\leq$ 50° C., so that the temperature of the polymerization mixture increases by at least 20° C. to a maximum temperature TP1H, without exceeding 80° C. and the polymerization temperature is then kept constant within the temperature interval from TP1H to TP1H −10° C. until a polymerization conversion U1 of at least 60 but not more than 90 mol %, based on the monomers to be polymerized in the first polymerization stage, is reached and the polymerization mixture is then cooled to a polymerization temperature TP2, where TP2=TP1±10° C. and 0° C. $\leq$ TP2 $\leq$ 50° C., c) a second monomer portion is added and the monomer mixture then present in the polymerization vessel is polymerized in the presence of the polymer already formed and in the presence of a dispersant and polymerization initiator in a second polymerization stage, beginning at the initial polymerization temperature TP2, so that the temperature of the polymerization mixture increases by at least 20° C. to a maximum value TP2H without exceeding 80° C. and the polymerization temperature is then kept constant within the temperature interval from TP2H to TP2H −10° C. until a polymerization conversion U2 of at least 60 but not more than 90 mol %, based on the total amount of monomers to be polymerized in the second polymerization stage, is reached and the polymerization mixture is then cooled to a polymerization temperature TP3, where TP3=TP1±10° C. and 0° C. $\leq$ TP2 $\leq$ 50° C., d) the procedure is then continued with the remaining n-2 monomer portions in n-2 successive polymerization stages in a manner corresponding to that for the second monomer portion and e) optionally, at the end of the n th polymerization stage, the polymerization is continued at a temperature of from 0° to 50° C.

2. A process as claimed in claim 1, wherein $2 \leq n \leq 5$.

3. A process as claimed in claim 1, wherein the temperature increase from the initial value to the maximum value in the individual polymerization stages takes place continuously.

4. A process as claimed in claim 1, wherein the monomer mixture to be polymerized consists of

| | |
|---|---|
| from 30 to 100% by weight | of at least one monomer A, |
| from 0 to 10% by weight | of one or more monomers which have at least one ethylenically unsaturated group and whose molal solubility in water at 1 bar and 25° C. ≧ the molal solubility of acrylonitrile in water at 1 bar and 25° C. (monomers B) and |
| from 0 to 70% by weight | of one or more copolymerizable monomers which differ from the monomers A and B and have at least one ethylenically unsaturated group (monomers C). |

5. A process as claimed in claim 1, wherein the monomer mixture to be polymerized comprises butadiene as monomer A.

6. A process as claimed in claim 1, wherein the monomer mixture to be polymerized consists of

| | |
|---|---|
| from 30 to 90% by weight of | butadiene, |
| from 1 to 10% by weight of | methacrylic acid and |
| from 9 to 60% by weight of | acrylonitrile. |

7. A process as claimed in claim 1, wherein the polymerization in the individual polymerization stages is carried out in the presence of molecular weight regulators.

8. A process as claimed in claim 1, wherein the polymerization in the individual polymerization stages is carried out in the presence of a mixture comprising at least one protective colloid and at least one emulsifier as dispersants.

9. A process as claimed in claim 1, wherein the polymerization in the individual polymerization stages is initiated by a free radical redox initiator system.

10. A process as claimed in claim 1, wherein the polymerization conversion achieved in the respective polymerization stage and based on the monomers to be polymerized in the respective polymerization stage is from 70 to 85 mol %.

11. A process as claimed in claim 1, wherein TP1 is from 0° C. to 20° C. and the maximum values of the polymerization temperature in the various polymerization stages are from 40° to 50° C.

12. A process as claimed in claim 1, wherein the composition of the monomer mixtures to be polymerized in the individual polymerization stages is essentially the same.

13. A process as claimed in claim 1, wherein the free radical aqueous emulsion polymerization is carried out in the individual polymerization stages in such a way that in each case the total amount of the polymerization batch intended for the respective stage, without the free radical initiator, is initially taken in the polymerization vessel, the initiation temperature is established, then the free radical initiator is added to the polymerization vessel and polymerization is effected.

14. A process as claimed in claim 1, wherein, at the end of the n th polymerization stage, the polymerization is continued at TP1±10° C. up to a total polymerization conversion of ≧95 mol %.

15. A process as claimed in claim 1, wherein each of the n monomer portions comprises ([100/n]−10) mol % of the total amount of monomer mixure to be polymerized.

16. A process as claimed in claim 1, wherein said process comprises step e) and wherein in step e) polymerization is continued up to a total polymerization conversion UTOT of ≧95 mol %, based on the total amount of monomers to be polymerized.

* * * * *